United States Patent Office 2,739,050
Patented Mar. 20, 1956

2,739,050
PREVENTION OF CORROSION

Thomas G. Wisherd, Tulsa, Okla., assignor to Sinclair Refining Company, New York, N. Y., a corporation of Maine No Drawing. Application April 12, 1951,
Serial No. 220,729

2 Claims. (Cl. 44—72)

This invention relates to preventing or retarding rusting, especially rusting due to water dissolved in or settled from light petroleum distillates, particularly gasoline. By light petroleum distillates, I mean petroleum distillates of a viscosity not exceeding that of gas oil.

Rust frequently occurs in gasoline pipe lines, storage tanks, and even in automotive equipment because of traces of moisture inevitably present in the gasoline. Although gasoline as it leaves the refinery is usually free of occluded moisture it may contain as much as 0.005 to 0.01% of dissolved moisture. Part of this dissolved moisture separates when the gasoline is chilled and settles as a separate liquid phase beneath the main body of gasoline. Water may also enter gasoline systems along with air through partially filled tanks provided with breather devices. As such a tank cools, for example, at night, its contents contract and moisture laden air is drawn in. This moisture condenses on the walls of the tank, settles to the bottom and dried air is expelled when the contents of the tank again warm up, as from the heat of the sun the next day. Repetition of this cycle eventually leaves an appreciable amount of moisture at the bottom of the tank.

As is obvious, the rust that forms permanently injures expensive equipment and there is additional loss in terms of replacement costs of such equipment and operating time lost during such replacement. For example, where rust forms on interior surfaces of product pipe lines and no effort is made to prevent it, this rust formation may reduce carrying capacity of the pipe by more than 12 per cent in one year. In addition to the decrease in life of rusted equipment such as storage tanks, there is danger of trouble in engine operation from failure of fuel carrying equipment and the likelihood of rust particles clogging carburetors or injecting devices for motors and burners, for example.

I have discovered that an oil-soluble ammonia neutralized sulfonated mixture of polyalkylated benzenes when present in light petroleum distillates, even in exceedingly small proportions, has the property of inhibiting the rusting of iron and steel surfaces, as in gasoline pipe lines, storage tanks, and automotive equipment. My invention, based on this discovery, thus involves the incorporation of a small amount of an oil-soluble ammonia neutralized sulfonated mixture of polyalkylated benzene in light petroleum distillates, particularly gasoline, whereby corrosion or rusting of iron or steel surfaces which come into contact with the distillate containing the inhibitor is markedly reduced or substantially prevented. The useful materials of my invention are derived from the bottoms from the production of dodecylbenzene (Neolene) and hereafter are referred to as the neutralized sulfonated Neolene bottoms or the inhibitor. The ammonia neutralized sulfonated Neolene bottoms I use are prepared by the sulfonation and subsequent ammoniation of the bottoms produced in the manufacture of monododecylbenzene, i. e., the bottoms remaining after fractionation to remove the monododecylbenzene cut from the reaction products of dodecene with benzene, which bottoms consist essentially of didodecylbenzene along with other polyalkylated benzene molecules. The amount of the neutralized sulfonated Neolene bottoms included in the distillate may range from about 2 to about 20 pounds per one thousand barrels of distillate. Typical concentrates which have been found to be highly useful and to substantially prevent rusting or corrosion of steel surfaces when present in an all-purpose gasoline, are from about 3 to about 10 pounds per one thousand barrels. I have found that the incorporation of this material in gasoline has no noticeable effect on the lead susceptibility, induction period, or gum formation and that it has no adverse effect on the other properties of the gasoline.

Although oil-soluble sulfonates have been recognized as important corrosion inhibitors, the ammonium and alkali salts of the usual materials sulfonated for use as corrosion inhibitors have in general proven too water-soluble to give satisfactory results. Consequently the oil solubility of my ammonia neutralized sulfonated Neolene bottoms was not to be expected. Moreover preliminary tests indicate that the efficiency of my ammonia neutralized Neolene bottoms as corrosion inhibitors may be significantly enhanced by holding the temperature in the sulfonation step of the preparation to a maximum of 125° F.

The following examples are offered to more clearly illustrate the improved anticorrosive and other properties of my neutralized sulfonated Neolene bottoms.

I compared the neutralized sulfonated Neolene bottoms as produced according to Example III with 10% in oil solution of a commercially used sulfonate-type inhibitor. This inhibitor, which I shall refer to as Inhibitor A, has the following test characteristics:

| | |
|---|---|
| Gravity, °API | 28.0 |
| Flash, °F | 385 |
| Fire, °F | 445 |
| Viscosity at 100 SUS | 416 |
| Viscosity at 130 SUS | 163 |
| Viscosity at 210 SUS | 49.2 |
| Viscosity index | 90 |
| Color | 4½ |
| Nitrogen (per cent) | 0.265 |
| Acid Number | 9.0 |
| Sulfur (per cent) | 0.60 |

EXAMPLE I

The inhibitors were added to distillate fuels (gasoline, No. 1 fuel oil and No. 2 fuel oil) and tested by a modification of the ASTM test for rust-preventing characteristics of steam turbine oil in the presence of water D—665–47T. In this modified procedure, a freshly ground rust test coupon consisting of a ½ inch diameter by 5¼ inches long mild steel rod is suspended in a 400-ml. beaker equipped with a stirrer and placed in a controlled bath capable of maintaining the temperature at 100± 1°F. The test fuel (350 ml.) is added and stirred for thirty minutes to allow the rust inhibitor to precoat the test specimen. Part (50 ml.) of the test fuel is then removed and 30 cc. of distilled water is added, and the mixture stirred for 3½ hour test period. At the end of this period, the coupon is removed, dried with suitable solvents, inspected and rated according to the following scale:

A—no rust
B++—trace of rust (covering a maximum of 0.25% of total surface area)
B+—0.25 to 5% of surface area covered by rust
B—5 to 25% of surface area covered by rust
C—25 to 50% of surface area covered by rust
D—50 to 75% of surface area covered by rust
E—75 to 100% of surface area covered by rust The test conditions are substantially more severe than ordinary conditions encountered so the results give a clear indication of the effectiveness of the inhibitor mixture.

In Gasoline

| Sulfonated Bottoms, #/1,000 Bbls. | Inhibitor A, #/1,000 Bbls. | Corrosion Rating |
|---|---|---|
| None | | D |
| 5 | | B+ |
| 7 | | A |
| 6 | | B |
| 8 | | A |
| 8 | | B+, B++ |
| 10 | | A |
| | 25 | B+ |
| | 28 | A |

In No. 1 fuel oil

| Sulfonated Bottoms, #/1,000 Bbls. | Inhibitor A, #/1,000 Bbls. | Corrosion Rating |
|---|---|---|
| None | | D |
| 5 | | B+ |
| 8 | | B++ |
| | 28 | A |

In No. 2 fuel oil

| Sulfonated Bottoms, #/1,000 Bbls. | Inhibitor A, #/1,000 Bbls. | Corrosion Rating |
|---|---|---|
| None | | D |
| 5 | | B+ |
| 8 | | A |
| 6 | | B+ |
| 8 | | B++ |
| 8 | | A |
| | 20 | B+ |
| | 28 | A |

EXAMPLE II

The inhibitors were added to a No. 2 fuel oil and also tested in accordance with the following static test procedure. A flat strip of mild carbon steel (⅛" x ½" x 5⅞") is cleaned with naphtha or other solvent to remove grease and oil and then polished with emery cloth until no rust or pits remain. During these polishing operations and subsequently, the strip should be handled with a clean lintless cloth or a piece of Kleenex tissue. After the strip has been thus prepared, it should be carefully wiped free of emery dust. The specimen together with 100 ml. of the sample to be tested are placed in a corked four ounce oil sample bottle which is allowed to lay on its side at room temperature for one hour. The liquid should cover the test specimen during this contact period. Then add 10 ml. of distilled water, cork tightly, and shake vigorously for three minutes to insure water wetting over the entire strip surface. The specimen should be tightly wedged between the cork and the bottom of the bottle to minimize breakage. The bottle is then restored to an upright position and allowed to stand at room temperature. The specimen is examined for rust daily after which the bottle is shaken again to replace water droplets on the specimen in the hydrocarbon phase that may have been disturbed during inspection.

In No. 2 fuel oil

| Sulfonated Bottoms, #/1,000 Bbls. | Inhibitor A, #/1,000 Bbls. | Failure Time in Hours [3] | |
|---|---|---|---|
| | | Hydrocarbon Phase | Aqueous Phase |
| 8 [1] | | 3,261+ | 180 |
| 16 [1] | | 3,809+ | 2,412 |
| | [2] 28 | 1,127 | 217 |
| | [2] 56 | 7,614+ | 2,273+ |

[1] Average of four tests.
[2] Average of 8 tests.
[3] Failure time is reported as the number of hours required for rust to form on more than 5% of the area covered by hydrocarbon or more than 25% of the area covered by water, discounting any rust occurring on corners and edges of strip which probably resulted from traces of pro-corrosive impurities left on by incomplete polishing.

Besides affording protection against corrosion the neutralized sulfonated Neolene bottoms are characterized by considerable ease in handling and do not have any toxic or other injurious effects on personnel. Furthermore the essential ingredient of my composition, i. e. the by-product bottoms from the manufacture of dodecylbenzene, and the materials necessary for the treatment of the bottoms can be obtained commercially at low cost.

In the practice of my invention, I customarily dilute the acid sulfonated bottoms with isopropanol, water and a non-volatile highly aromatic petroleum solvent before the neutralization with anhydrous ammonia. However the amount and type of diluent added to the acid sulfonates prior to neutralization is not an essential part of the product and may be varied as desired or eliminated entirely depending upon the use of the sulfonates. The diluent is added only for the purpose of reducing the viscosity of the sulfonates to facilitate handling.

Tests and the compositions of three typical concentrates follow:

| | | | |
|---|---|---|---|
| Pour | | −25 | |
| Nitrogen, Percent | 2.83 | 2.24 | 2.12 |
| Sulfur, Percent | 4.68 | 4.52 | 4.57 |
| Acid. No | 70.3 | 90.2 | 77.3 |
| Saponification No | 99.7 | 96.6 | 86.8 |
| Ash | .278 | .002 | .013 |

As I have stated, the amounts of the neutralized sulfonated Neolene bottoms employed are between 2 to 20 pounds per one thousand barrels of distillate. The actual amount of inhibitor employed within the above range is ordinarily directly related to the corrosiveness of the particular light distillate and the resistance of the metallic surfaces to corrosion. For example, flow interruptions in light distillate pipe lines and varying temperatures and pressures in such pipe lines and in storage tanks are capable of affecting corrosion considerably. Of course, the actual measure of corrosion, and therefore regulation of inhibitor concentration, can be determined in the last analysis by the actual deterioration in the physical condition of the metallic surface involved. However, it may not be practical to rely on such visual inspections since the damage is then already affected. Accordingly, metal test blanks may be used for insertion into the distillate stream or tank and removed and examined at periodic intervals.

An illustration of the method of preparation of my novel neutralized sulfonated Neolene bottoms, is presented in the following example.

EXAMPLE III

The bottoms from the production of dodecylbenzene which I employed in producing this particular concentrate were "Neolene 400 Bottoms" obtained commercially from the Sharples-Continental Corporation. Typical physical properties of "Neolene 400 Bottoms" are as follows:

Engler Range, ° F.
- IBP _____ 644
- 1% _____ 671
- 2% _____ 685
- 3% _____ 690
- 4% _____ 695
- 5% _____ 698
- 20% _____ 723
- 50% _____ 739
- 70% _____ 753
- 90% _____ 775
- 92% _____ 777
- 93% _____ 778
- 94% _____ 779
- 96% _____ 780
- 97% _____ 780
- 98% _____ 780
- FBP _____ 780
- Per cent rec _____ 99

Engler Range, ° F.
- Spec. gravity at 100° F _____ 0.8639
- Spec. gravity at 130° F _____ 0.8545
- Viscosity in centipoises at 130° F ___ 45.8
- Color _____ Dark Brown
- Molecular weight _____ 403±15

"Neolene 400 Bottoms" were charged in the amount of 1888 pounds to a conventional type Monel sulfonator and sulfonated by the addition of commerical 20% oleum totaling 1782 pounds. The mass was agitated continuously during the addition of the oleum and the temperature was held to a maximum of 147° F. by the circulation of cooling water through continuous coils located in the acid mass, and by the rate of oleum addition. The total time required for oleum application was 50 minutes.

The acid mass was next washed by the gradual application of 1335 pounds of water. Agitation was continued during the washing operation and until the sulfonated bottoms-diluted acid mass was pumped to the settler. Due to the heat evolved by dilution of the partially spent oleum during the washing operation the temperature rose rapidly. The washing temperature was held to a maximum of 196° F. by controlling the rate of addition of the water and by means of the cooling coils. The time required for the washing operation was 90 minutes and the final temperature was 185° F. The washed sulfonated mixture was then pumped to a glass-line, water-jacketed settling tank which had been brought to 185° F. by injecting steam into the water in the jacket. The mass was allowed to settle without any further application of heat for a period of 16 hours. At the end of the 16 hour settling period the temperature of the mass was 152° F.

The diluted acid was now drawn from the bottom of the settler and discarded. The acid sulfonates, containing only a small amount of dilute sulfuric acid, were drawn to a neutralizing vessel and diluted with 18 gallons of 99% isopropanol, 18 gallons of water, and 35 gallons of a non-volatile, highly aromatic petroleum solvent. The diluted acid sulfonates were neutralized by the addition of 122 pounds of anhydrous ammonia, and the finished product drawn to drums for storage. The yield was 356 gallons. The material produced by the above process may or may not contain some excess ammonia. It is semi-viscous fluid at atmospheric temperatures and is miscible in all proportions with paraffinic petroleum oils such as kerosine and low viscosity white oils.

I claim:

1. A light petroleum distillate fraction into which has been incorporated amounts in the range approximating 2 to 20 pounds per one thousand barrels of petroleum distillate of ammonia neutralized sulfonated bottoms produced in the manufacture of dodecylbenzene which bottoms consist essentially of didodecylbenzene and other polyalkylated benzenes.

2. The composition of claim 1 wherein the light petroleum distillate fraction is gasoline.

References Cited in the file of this patent

UNITED STATES PATENTS

| | | |
|---|---|---|
| 2,296,069 | Talbert _____ | Sept. 15, 1942 |
| 2,562,845 | Reamer _____ | July 31, 1951 |
| 2,594,266 | Watkins _____ | Apr. 22, 1952 |

FOREIGN PATENTS

| | | |
|---|---|---|
| 922,948 | France _____ | June 23, 1947 |

OTHER REFERENCES

Sulfonation Product of Mineral Oil, Sperling, in May 1948, Industrial and Engineering Chemistry, pp. 890 and 891.